US 6,615,248 B1

(12) United States Patent
Smith

(10) Patent No.: US 6,615,248 B1
(45) Date of Patent: Sep. 2, 2003

(54) METHOD AND SYSTEM FOR PRESENTING CONTENT SELECTION OPTIONS

(75) Inventor: Kim C. Smith, Colleyville, TX (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/374,781

(22) Filed: Aug. 16, 1999

(51) Int. Cl.⁷ .............................................. G06F 15/16

(52) U.S. Cl. ..................... 709/217; 709/217; 709/219

(58) Field of Search ................................ 709/217, 219, 709/203, 250, 231; 707/10; 345/721, 781

(56) References Cited

U.S. PATENT DOCUMENTS

| | | | |
|---|---|---|---|
| 3,617,630 A | | 11/1971 | Reiffel |
| 3,898,377 A | | 8/1975 | Fairbairn ........................ 178/6 |
| 4,425,581 A | | 1/1984 | Schweppe ..................... 358/148 |
| 4,706,121 A | | 11/1987 | Young .......................... 358/142 |
| 5,038,211 A | | 8/1991 | Hallenbeck .................. 358/142 |
| 5,613,190 A | | 3/1997 | Hylton ......................... 455/3.1 |
| 5,666,293 A | | 9/1997 | Metz et al. ............... 395/200.5 |
| 5,740,549 A | * | 4/1998 | Reilly et al. .................... 705/14 |
| 5,754,783 A | | 5/1998 | Mendelson et al. .... 395/200.47 |
| 5,774,664 A | | 6/1998 | Hidary et al. .......... 395/200.48 |
| 5,774,666 A | | 6/1998 | Portuesi .................. 395/200.48 |
| 5,778,181 A | | 7/1998 | Hidary et al. .......... 395/200.48 |
| 5,819,273 A | * | 10/1998 | Vora et al. ...................... 707/10 |
| 5,857,181 A | * | 1/1999 | Augenbraun et al. ....... 702/102 |
| 5,933,827 A | * | 8/1999 | Cole et al. ...................... 707/10 |
| 5,991,735 A | * | 11/1999 | Gerace ......................... 705/10 |
| 6,005,565 A | * | 12/1999 | Legall et al. ................ 345/721 |
| 6,151,059 A | * | 11/2000 | Schein et al. ............... 345/721 |
| 6,172,677 B1 | * | 1/2001 | Stautner et al. ............. 345/716 |
| 6,215,483 B1 | * | 4/2001 | Zigmond .................... 709/217 |
| 6,236,395 B1 | * | 5/2001 | Sezan et al. ................ 345/723 |
| 6,452,609 B1 | * | 9/2002 | Katinsky et al. ............ 709/219 |

FOREIGN PATENT DOCUMENTS

| | | |
|---|---|---|
| DE | 198 14 254 | 10/1998 |
| EP | 0 749 081 | 12/1996 |
| EP | 0 854 645 | 7/1998 |
| WO | WO 97 13368 | 4/1997 |
| WO | WO 98 43183 | 10/1998 |

OTHER PUBLICATIONS

Microsoft Webtv, "what is WebTV?", URL:http://www-.webtv.net/intro/whatis.html.
PowerVu(TM) Digital Video Compression Systems advertisement; Satellite Television Networks; "Power Vu ® Digital Video Compression Systems" Copyright© 1995,1996, 1997,1998 Scientific–Atlanta, Inc. Jun. 98, URL: http://www.sciatl.com/d/satellitetvnetworks/products/powervu/powervu.html.
Bell South advertisement, "Interactive Program Guide", Jun. 98, URL: http://www.bims.bellsouth.net/tour/mmds 8.html.
PC Magazine Online–Copyright© 1997, Microsoft Internet Explorer 4.0, URL: http://www.zdnet.com/pcmag/features/jit/browser/msie4.htm.

* cited by examiner

Primary Examiner—Ayaz Sheikh
Assistant Examiner—Philip B. Tran
(74) Attorney, Agent, or Firm—Angelo N. Chaclas; Charles A. Malandra; George M. Macdonald

(57) ABSTRACT

A method and system for enabling content from a plurality of content sources of one or more types to be searched, displayed, and easily accessed for consumption. A user may concurrently view a plurality of display areas, including a tuned media display area, a page index display area, a search results area, an area for displaying links to alternate guides or search engines. The page index area includes links to pages that contain search results, as well as links to user defined category pages. The search results area displays search results as user-selectable links. Associated with each displayed search result are additional selectable objects that allows a user to search for related content. A display options feature allows a user to select the level of detail presented in the other display areas.

21 Claims, 5 Drawing Sheets

METHOD AND SYSTEM FOR PRESENTING CONTENT SELECTION OPTIONS

CROSS REFERENCE TO RELATED APPLICATIONS

U.S. patent application Ser. No. 09/354,052 filed Jul. 15, 1999 entitled "A Method of Searching Across Media and Source Types," of common assignee herewith, Spotware Technologies, Inc., Reference No. 98-0883, incorporated herein by reference.

U.S. patent application Ser. No. 09/298,006 filed Apr. 22, 1999 entitled "A Method of Creating Default Lists of Content of Probable Interest," of common assignee herewith, Gateway Reference No. 98-0884, incorporated herein by reference.

U.S. patent application Ser. No. 09/299,826 filed Apr. 26, 1999 entitled "Method of Maintaining Search Results Pages," of common assignee herewith, Gateway Reference No. 98-0881, incorporated herein by reference.

U.S. patent application Ser. No. 09/298,005 filed Apr. 22, 1999 entitled "Universal Content Database Structured Around Relationship Being Like," of common assignee herewith, Gateway Reference No. 98-0882, incorporated herein by reference.

FIELD OF THE INVENTION

The present invention relates generally to methods of searching for available media content; and more particularly, to a method of searching across multiple media content sources via a single user interface.

BACKGROUND OF THE INVENTION

Interactive user interfaces, ranging from the simple to the extremely elaborate, can be found in many devices. Digital watches are an example of one of the simplest interactive user interfaces. To use the interface provided with most digital watches for adjusting the time, a user presses a button causing the watch's screen to flash, thereby signaling the user that the watch is ready to receive further input. At that point, the user usually depresses another button and holds the button down until the correct desired time is displayed. After the desired time is displayed, another button is pushed, and normal timekeeping operation is resumed. This is, of course, one of the most rudimentary examples of an interactive user interface. When most people talk about interactive user interfaces, they are referring to more complex user interfaces like the ones used on personal computers. These interfaces allow users to perform actions like changing screen colors, changing the size of elements within the display, changing which elements are displayed, and changing the manner in which they are displayed, merely by touching a button. Somewhere between these two extremes lie the vast majority of interactive user interfaces.

A common user interface that falls between the two extremes of a digital watch and a computer interface is an Electronic Program Guide (EPG). EPGs allow users not only to display information, but also to search through the information using various keys. The search results can be used to schedule reminders to be displayed at designated times, schedule program recording, or perform any number of other functions.

However, EPGs are limited by their very nature. They are designed to display broadcast program listings and to perform simple selection options, which they do very well, but unfortunately, program guides generally do not contain information for media types other than normal broadcast media. In addition, most EPGs have complex and detailed menu systems which users must slog through to find a desired program. In some current products, an Internet web browser is displayed on the same display device used for displaying television programs, possibly in hopes of providing users easy access to Internet media. However, search engines available on the Internet are often as difficult, if not more difficult, to use than EPG menu systems.

A shortcoming of both EPGs and Internet search engines is that they both function efficiently only within limited domains. While web sites may be found on the Internet that contain program listings, finding program listings using one of the common Internet search engines such as Yahoo would be anything but easy for a majority of people. Another problem with many search utilities, particularly those used in EPGs, is that they do not maintain an index of past search results. For example, if a user were to perform a search to identify all football games that were showing on a particular day and then later, the user tried to identify all the basketball games that were showing that day, the user would have to repeat the football game search if he wanted to go back and find the information about the football games again. Some Internet browsers actually do maintain a record of previous pages visited. However, they do not maintain a record of search results. Each time a search is performed, the previous search results are reset. Another drawback of current EPG technology is that many times, if a user wishes to perform a search, particularly an advanced search, the EPG fills the whole display without leaving space for a program currently being viewed by the user.

Finally, and perhaps most importantly, EPGs are not designed to identify items of probable user interest from user preferences and habits. For example, suppose that a user watches the 5 o'clock news every weekday at 5:00 p.m. If the user had searched for action movies Sunday night and did not use the EPG again until Monday at 5:00 p.m., most EPGs currently in use would initially display the "action movie" search screen or possibly a standard startup screen when, in fact, the user wants to find news programs.

Therefore, what is needed is a user interface, method, system, signal and software that provide a single user interface where content of probable user interest, associated with a plurality of content sources of one or more types, can be searched, displayed and easily accessed.

SUMMARY OF THE INVENTION

Accordingly, the present invention provides a method for searching, accessing and displaying data from various content sources through a single user interface. The method comprises providing a first user selectable object via the single user interface, and providing a second user selectable object via the single user interface. The first user selectable object being a link to a first content source, and the second user selectable object being a link to a second content source, wherein the second content source differs from the first content source. The method also comprises receiving a user generated search query; searching through data available from the first content source and from the second content source for data related to the user generated search query; displaying results of data found from the first content source and/or the second content source determined to be related to the user generated search query. The method further provides a user with a first selectable link for accessing a first relevant data from the found data.

The present invention further provides a system for searching, accessing and displaying data from various content sources through a single user interface. The system comprises at least one processor, memory operably associated with the processor, and a program of instructions configured to be stored in the memory and executed by the processor. The program of instructions is configured to implement a method comprising providing a first user selectable object via the single user interface, and providing a second user selectable object via the single user interface. The first user selectable object being a link to a first content source, and the second user selectable object being a link to a second content source, wherein the second content source differs from the first content source. The method implemented also comprises receiving a user generated search query; searching through data available from the first content source and from the second content source for data related to the user generated search query; displaying results of data found from the first content source and/or the second content source determined to be related to the user generated search query. The method implemented by the program of instructions further provides a user with a first selectable link for accessing a first relevant data from the found data.

Additionally, the present invention provides a computer readable medium tangibly embodying a program of instructions for searching, accessing and displaying data from various content sources through a single user interface. The program of instructions comprises the steps of providing a first user selectable object via the single user interface, and providing a second user selectable object via the single user interface. The first user selectable object being a link to a first content source, and the second user selectable object being a link to a second content source, wherein the second content source differs from the first content source. The program of instructions also comprises receiving a user generated search query; searching through data available from the first content source and from the second content source for data related to the user generated search query; displaying results of data found from the first content source and/or the second content source determined to be related to the user generated search query. The program of instructions further provides a user with a first selectable link for accessing a first relevant data from the found data.

It is an object of the present invention to provide a single user interface where content information from a plurality of content sources and types can be searched, displayed, and easily accessed for consumption.

It is a further object of the present invention to provide a user interface configured to initially display items of probable user interest.

An advantage of the present invention is that it provides the ability to search for content across a plurality of content sources of one or more types.

A further advantage of the present invention is that it allows users to go directly to consuming content identified in a search by selecting a displayed object.

Another advantage of the present invention is that it allows a user to initiate a subsequent search for media content based upon items returned by an initial search.

An additional advantage of the present invention is that it provides links to specialized search engines.

Another advantage of the present invention is that the initial states of the displayed menus are configured to include items of probable user interest.

Another advantage of the present invention is that a plurality of objects may be displayed concurrently with tuned media content.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF A PREFERRED EMBODIMENT OF THE INVENTION

In the following detailed description of preferred embodiments, reference is made to the accompanying drawings which form a part hereof, and in which is shown by way of illustration, specific preferred embodiments in which the invention may be practiced. These embodiments are described in sufficient detail to enable those skilled in the art to practice the invention, and it is to be understood that other embodiments may be utilized and that logical, mechanical and/or electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
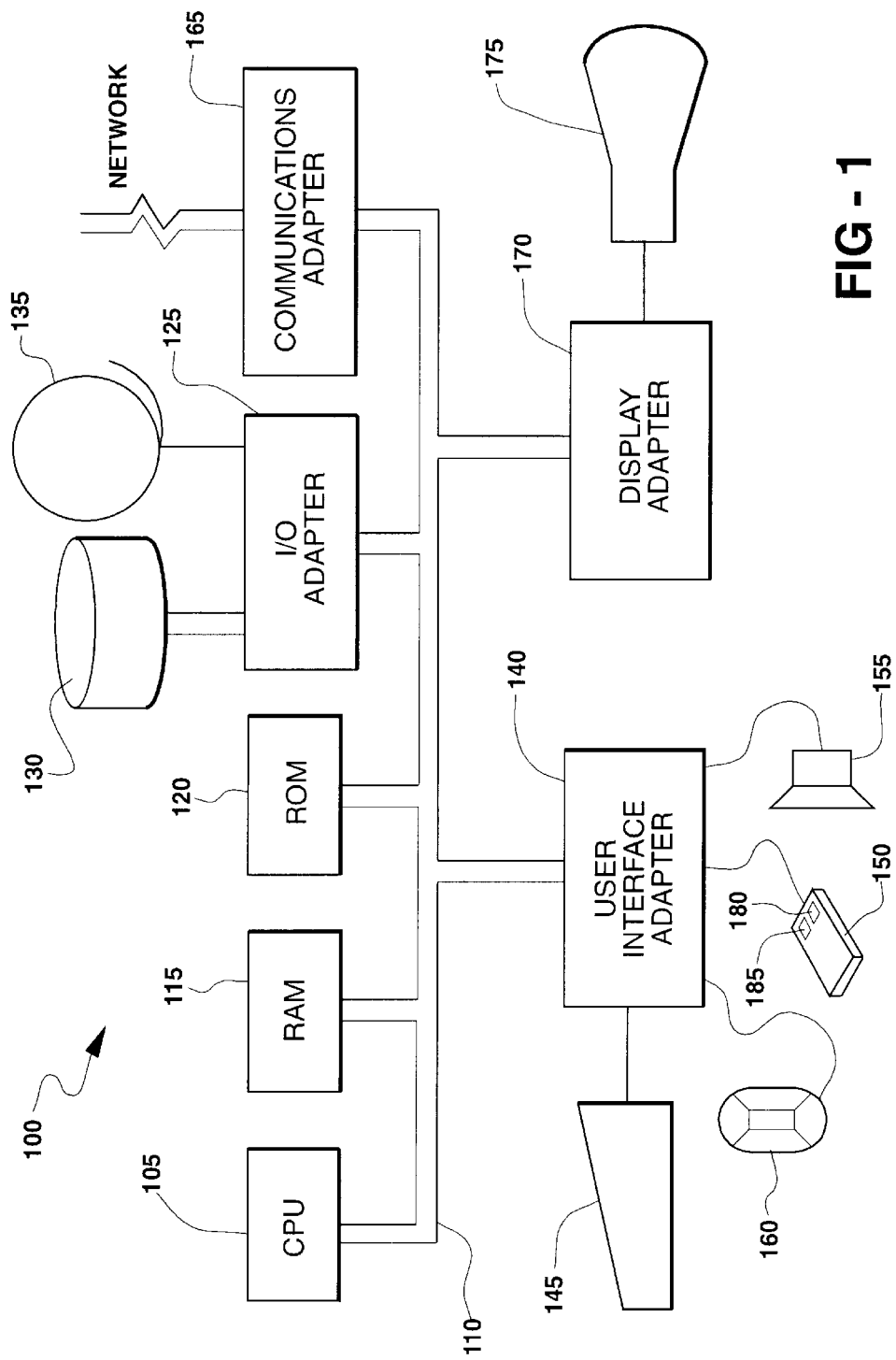
FIG. 1 illustrates a detailed block diagram showing a computer system according to a preferred embodiment of the present invention.

A representative hardware environment for practicing the present invention is depicted in FIG. 1 which illustrates a typical hardware configuration of an information handling system 100 in accordance with the present invention, having a central processing unit (CPU) 105 such as a conventional microprocessor and a number of other units interconnected via at least one system bus 110. Information handling system 100 may be, for example, a portable or desktop Gateway computer or a Gateway Destination system (Gateway and Destination are trademarks of Gateway, Inc.). Information handling system 100 shown in FIG. 1 includes random access memory (RAM) 115, read-only memory (ROM) 120 wherein the ROM 120 could also be erasable programmable read-only memory (EPROM) or electrically erasable programmable read-only memory (EEPROM), and input/output (I/O) adapter 125 for connecting peripheral devices such as a disk unit 130 and a tape drive 135 to system bus 110, a user interface adapter 140 for connecting a keyboard 145, a mouse 150, a speaker 155, a microphone 160, and/or other user interface devices to system bus 110, a communications adapter 165 for connecting information handling system 100 to an information network such as the Internet, and a display adapter 170 for connecting system bus 110 to a display device such as monitor 175. The mouse 150 typically has a first button and a second button, 180 and 185*b* respectively, and is used to control a cursor (not shown) displayed on the monitor 175.

Figure 2:
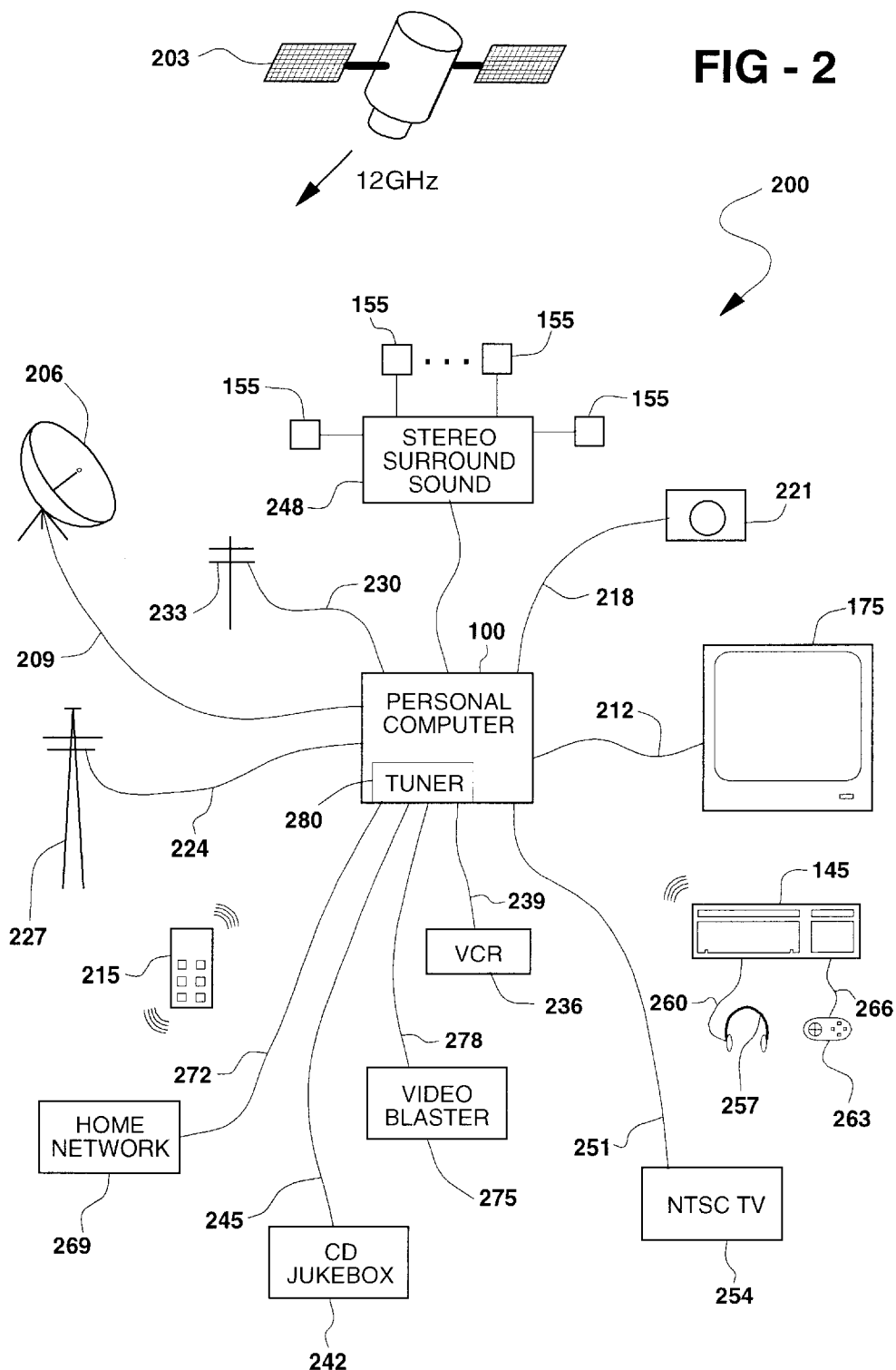
FIG. 2 illustrates a detailed block diagram showing a convergence system according to a preferred embodiment of the present invention.

Referring next to FIG. 2, a system 200 is shown in general detail. Reference numerals or letters in FIG. 2 which are like, similar, or identical to the reference numerals or letters of FIG. 1 indicate like, similar, or identical components or features. External to system 200 is satellite 203 which, in one preferred embodiment, is a HS601 model operated by Hughes at a 101 degree west longitude geosynchronous orbital location. Satellite 203 transmits signals comprising 150 channels of modulated digital video, audio, and data at a frequency of about 12 GHz. The satellite signals are received by system 200 by antenna 206 containing a low noise block converter amplifier. Antenna 206 is preferably about 18 inches in diameter and receives left-hand and right-hand circularly polarized signals between 12.2 and 12.7 GHz. Antenna 206 provides a "down converted-spectrum" signal between 950 and 1450 MHz via a coaxial cable or other suitable communication medium 209 to information handling system 100 such as a personal computer or other system or circuitry capable of processing data. Suitable antennas 206 are already being manufactured and sold by RCA corporation by direct sales and through numerous major retail chains such as Radio Shack.

System 100 contains circuitry and software to further process signals from the antenna, generally demodulating and decoding the signal to produce a VGA (video graphics adapter) signal. The VGA signal is provided via standard VGA compatible monitor cable 212 to drive large screen data quality monitor 175 suitable for viewing in a family room or entertainment room environment. System 100 provides for user input by means of remote controls 215 and 145. Remote control 215 comprises a hand-held size device with standard television controls and a numeric keypad and, in one embodiment, video cassette recorder (VCR) controls and a pointing device. It provides radio frequency (RF) or infrared (IR) control signals received by system 100. Remote control 145 is a full function personal computer keyboard with additional standard television and VCR controls, a pointing device which is preferably in the form of a touchpad, and it also provides RF control signals to system 100. RF control signals were selected over IR or hardwired in one embodiment due to its benefits in a home entertainment environment. Monitor cable 212 is a standard type cable typically used on VGA display devices and comprises up to 15 electrical conductors interfacing with monitor 175 in a D-series shell connector. In one embodiment, full multimedia sourcing and destinationing of audio/video/data (A/V/D) broadcast are provided for. Although the embodiment presented herein discusses the use of VGA signals, it should be mentioned that with an appropriate change in hardware, National Television Standard Committee (NTSC) compliant signals and NTSC compliant hardware will employ the present invention in the manner mentioned herein.

Information handling system 100 may include a tuner 280, tuner circuitry, or card capable of both tuning to multiple channels and receiving television information or signals in the form of the NTSC or Phase Alteration Line (PAL) form from any medium carrying signals from satellite dish 206 which provides digital A/V/D signals from such sources as DirecTV or Primestar (DirecTV and Primestar are trademarks of their respective companies). In another such embodiment, the signals carried on medium 209 provide analog A/V such as NTSC antenna signals. In another such embodiment, the signal carried on medium 218 from camera 221 provides analog A/V such as NTSC audio/video signals. In further embodiments, the signal carried on medium 224 from cable-data source 227 provides analog and/or digital A/V/D. In further such embodiments, the signal carried on medium 230 from Public Switched Telephone Network (PSTN) 233 provides data or phone signals such as integrated services digital network (ISDN) or plain old telephone system (POTS) signals. In one set of such embodiments, system 100 is programmed to automatically record analog signals such as television programming onto recordable media such as a video tape in VCR 236 coupled to cable 239. In another such set of embodiments, system 100 is programmed to automatically record digital signals such as digital television programming, Digital Versatile Disk (DVD) programming, or compact disk read-only memory (CD-ROM) type audio onto recordable media such as recordable compact disks in CD/DVD jukebox 242 coupled to cable 245. CD/DVD jukebox 242 also plays CDs, CD-ROMs, or DVDs for use elsewhere. In another such embodiment, signals are sent to stereo surround system 248 for audio output to one or more speakers 155 and on cable 251 to TV 254. In one such embodiment, earphones 257 on cable 260 and game pad 263 on cable 266 provide additional input/output through remote control 145. Home network 269 is "smart wiring" used to transmit data and control within the home, coupled by cable 272 to system 100. Videoblaster 275 provides video signal processing on cable/connector 278. Cables 224, 209, 230, 218, 251, 239, 278, 245, 260, and 153 are examples of communications links that can be wired coupling or wireless, such as RF or IR.

One example of convergence system 200 is the Destination System using the DestiVu user or media interface manufactured and sold by Gateway 2000, Inc. In this manner, convergence system 200 is a fully functional computer integrated with a television, providing TV viewing (via broadcast, cable, satellite, VCR, digital disk, or other broadcast media) and personal computing functionality. This convergence of computer and television provides a user with combined access to both television programs and information and computer-related functionality such as computer information and programs and Internet access.

Although many of today's televisions employ many of the same hardware resources employed by computers such as information handling system 100, it is possible that the present invention might be practiced in other electronic devices or networked electronic devices. For example, with the development of audio/video networking such as the recently proposed HAVi standard, television sets or other audio/video devices such as audio/video receivers and VCRs that do not themselves contain such resources could implement the present invention by using the resources of other devices on a network.

Figure 3:
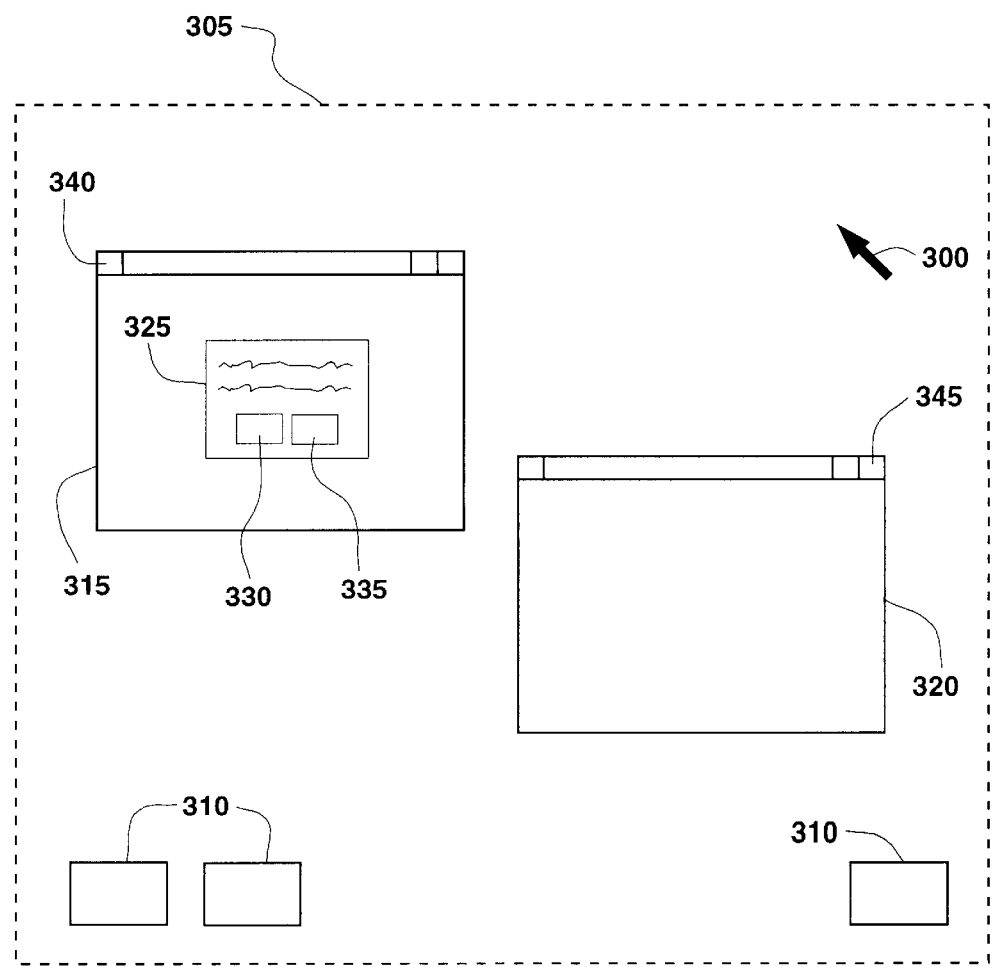
FIG. 3 shows the desktop of a computer operating system's user interface typically employed on a computer system as in FIGS. 1 and 2, according to a preferred embodiment of the present invention.

Referring next to FIG. 3, a detail of an operating system's graphical user interface, or GUI, as is typically displayed on monitor 175 in accordance with the present invention is illustrated. Reference numerals or letters in FIG. 3 which are like, similar, or identical to the reference numerals or letters of FIGS. 1–2 indicate like, similar, or identical components or features. The operating system shown in FIG. 3 is IBM's OS/2 (OS/2 is a trademark of International Business Machines Corporation). However, the present invention will work with DestiVu, Windows 98, Windows 95 (DestiVu is a trademark of Gateway, Inc. and Windows 98 and Windows 95 are trademarks of Microsoft Corporation), or any other graphical user interface. This GUI includes cursor 300, desktop 305, three icons 310, a first window and a second window, 315 and 320 respectively, and dialog box 325, all of which are well known in the art. Dialog box 325 further contains a first and a second button, 330 and 335 respectively. Programs are represented by the graphical user interface as either icons 310 or windows 315 or 320. The horizontal region along the top of a the first and second windows, 315 and 320, are called a first title bar and a second title bar, 340 and 345 respectively. A program window 315 or 320 has the "focus" when it has been designated by the user or by the operating system to receive input from keyboard 145 or mouse 150. In OS/2®, the user gives the window focus by clicking a mouse button 180 or 185 when cursor 300 is inside that window. Some operating systems, however, give a window the focus merely whenever cursor 300 is present within that window. The operating system indicates which program has the focus by changing the color of the focused window's title bar, 340 or 345.

Figure 4:
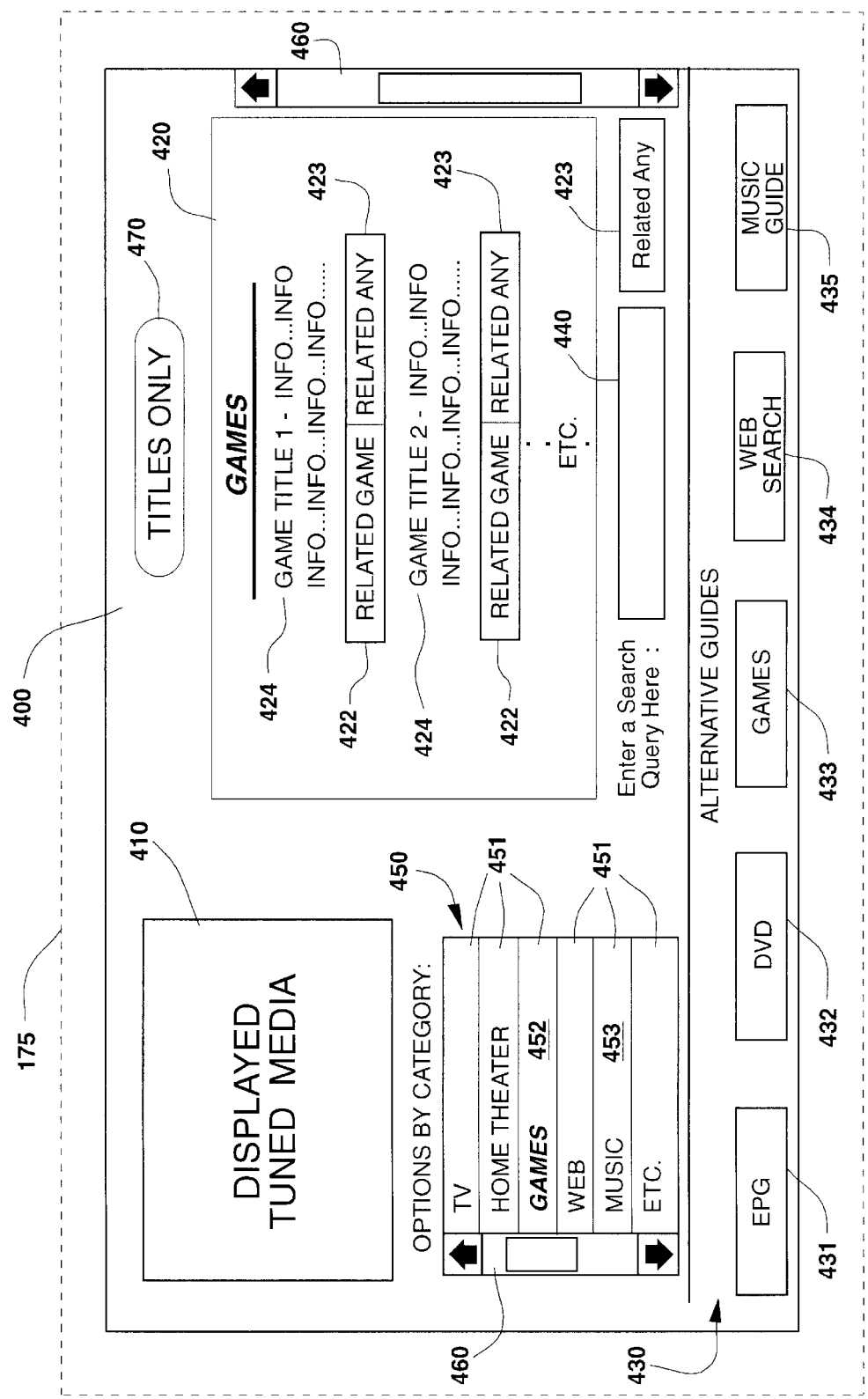
FIG. 4 illustrates the user interface of the present invention prior to utilization according to a preferred embodiment.
Figure 5:
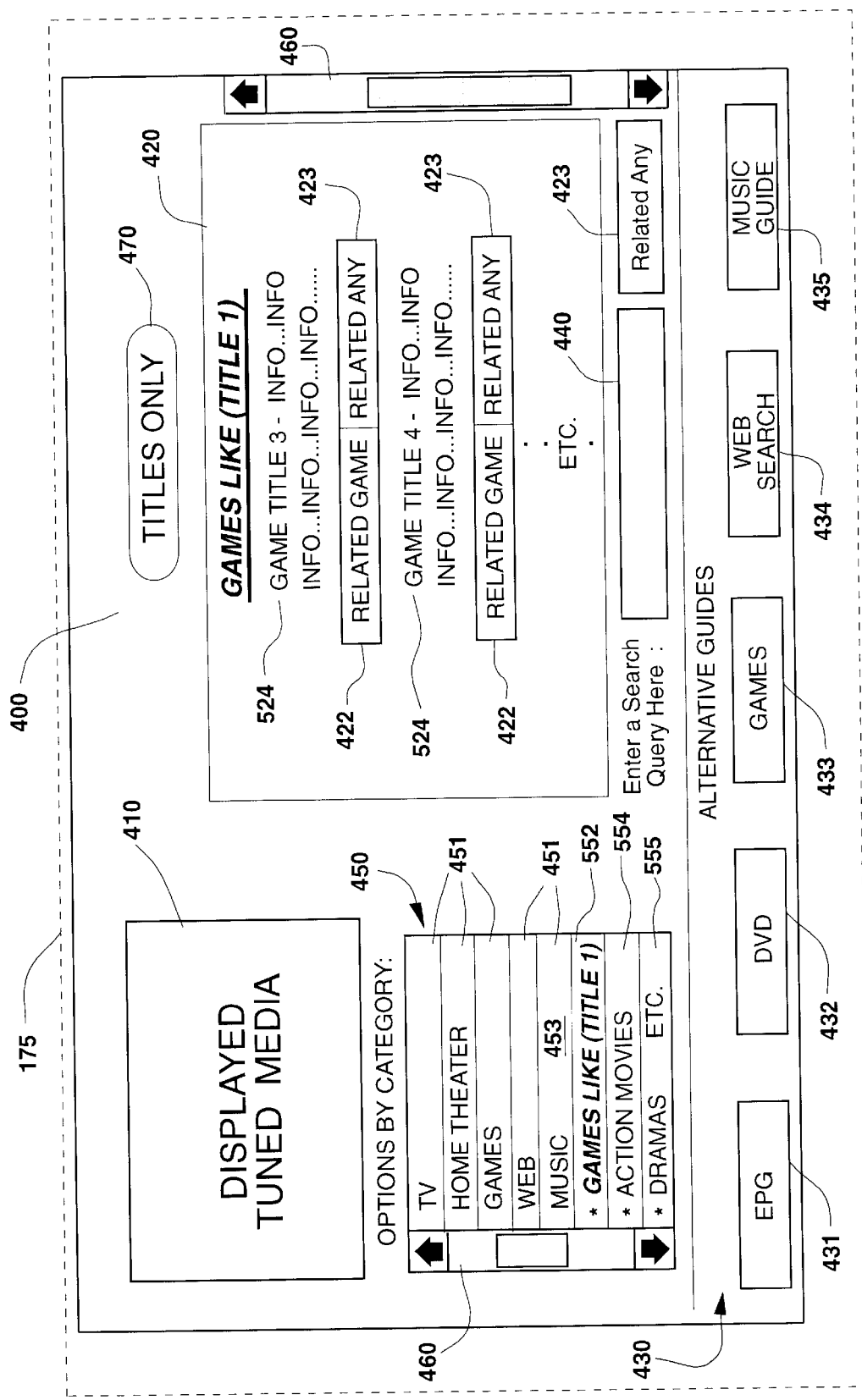
FIG. 5 illustrates the user interface of FIG. 4 after a search has been performed according to a preferred embodiment of the present invention.

A system for implementing the preferred embodiment of the present invention has been described in the previous paragraphs. A user interface practiced by a preferred embodiment of the present invention, as illustrated in FIGS. 4 and 5, is described next. Reference numerals or letters in FIGS. 4 and 5 which are like, similar, or identical to the reference numerals or letters of FIGS. 1–3 indicate like, similar, or identical components or features.

Referring first to FIG. 4, a user interface of the present invention is illustrated. There are five basic display areas implemented by the present invention, 410, 420, 430, 450 and 470. The first area, tuned media display area 410 is for displaying tuned media content. Tuned media display area 410 uses an entire available display area 400 when no other objects are displayed. This means that when a user is viewing tuned media content, for instance a broadcast television program, and not displaying any search or program information, the tuned media content is viewed at full size. If, however, a user decides that they want to access information relating to a program they are viewing or if they wish to conduct a search for another program, then tuned media display area 410 can be scaled to take up only a portion of the screen, thereby allowing other areas generated by the present invention, such as areas 420, 430, 450 and 470, to be displayed. Tuned media display area 410 is not restricted to displaying only broadcast media streams; it can also display content of other types or from other sources such as Internet information, cable television programs, satellite programs, or even a pre-recorded video cassette or DVD program.

Still referring to FIG. 4, page index area 450 includes user selectable links, such as default category guide page links 451, to pages containing categorized information. The pages containing categorized information are maintained in a page index. In one embodiment of the present invention, the page index includes user selectable links to a TV page, a home theater page, a games page, a web page, and a music page. These pages contain categorized information, possibly provided by a user, about preferred media content. A preferred embodiment of the present invention does not require a user to enter preferences, but manually entering user preferences may be supported. As an example (not illustrated) of how user preferences could be entered into category pages, suppose that a user enjoys listening to a local country music station KTRY, a rock music station KROK, and an easy listening station KEZZ. In one embodiment of the present invention, users can conduct searches for currently available radio stations using one of the user selectable objects configured to initiate searches for content information such as EPG 431, DVD 432, Games 433, Web Search 434, or Music Guide 435, accessible through the present invention's user interface. A list of currently available radio stations is then displayed in search results area 420. Once a list is displayed, a user can select which stations to add to the music page, thereby creating a list of favorite radio stations. From then on, whenever the user selects the default category guide Music 453, his favorite radio stations, KTRY, KROK, and KEZZ, will be displayed in Search Results Area 420. Similar methods can be used to store information in other default category guide page links 451. In a preferred method of the present invention, a user can select which category guides are initially displayed when the system is started.

As shown in FIG. 5, in addition to displaying default category guide page links 451 each time Graphical User Interface 400 is initialized, an updated category guide page link such as Games Like 552, Action Movies 554, or Dramas 555 is added to the page index every time a unique search is performed. For example, suppose a user is looking for something to watch on television, and the user initiates a search for action movies currently showing, using EPG 431. Only two action movies are returned by the search, and the user is not interested. The user next initiates a search for dramas currently showing. Four dramas are returned as a result of the search, but again the user is not interested. If the user changes his mind and decides to go back and see what action movies are showing, he does not need to initiate another search using EPG 431. Instead, he can simply go to Updated Page Index Area 550 and select Action Movies 554 to display the results of his previous search for action movies. Updated Page Index Area 550 is not reset with each new search, but instead, each search is saved until either the user discards the search results or the user terminates the session. If there are too many page links to be displayed at one time in page index area 450 or updated page index area 550, scroll bar 460 is generated allowing the user to easily move through the list of indexed pages.

The next area to be discussed is Search Results Area 420. As mentioned in the previous paragraph, search results area 420 displays information returned from searches initiated through one of the present invention's user selectable objects 431, 432, 433, 434, 435 or user selectable page links 451. Additional selectable objects Related Similar 422 (shown as Related Game 422 in FIGS. 4 and 5) and Related Any 423 will be discussed in further detail below. The search results are preferably displayed in a hyperlink format that allows a user to select an item for immediate consumption simply by clicking on hyperlinked titles 524. In a preferred embodiment of the present invention, hyperlinked titles 524 are the names of programs returned as a result of a search, but hyperlinked titles 524 can take other forms such as buttons or icons of some sort. Below each item returned as a result of a search, the present invention implements objects Related Similar 422 and Related Any 423. These objects, which can take the form of user-selectable buttons, allow users to easily initiate a search for currently available media content related to hyperlinked titles 524. Object related similar 422 accesses a search routine for finding similar content only within the same media category as a displayed item. Object Related Any 423 accesses a search mechanism that returns related media items and relevant data regardless of what media category those items are in.

Data, according to a preferred embodiment of the present invention, includes, but is not limited to, video and audio content, electronic representations of written or printed material; and information available through the Internet, program guides, electronic catalogs, and databases. The present invention is not limited to only the data types listed; one skilled in the art can employ other data types without departing from the spirit and scope of the present invention.

In a preferred embodiment, the user is able to directly enter a "search query" in query entry 440 and select the Object Related Any 423 option to search across various content sources, such as an EPG, the Internet, Games, Music Guide, etc., for relevant data relating to the "search query", rather than having to conduct an initial content specific search before being able to select the Object Related Any 423 search option.

Referring back to FIG. 4, for example, suppose a user has selected default category page link Games 452 from Page Index Area 450. The present invention has returned selectable links, Hyperlinked Titles 424, which are displayed in Search Results Area 420. The selectable links, Hyperlinked Titles 424, may be Monopoly and Risk, for example. Below each of the selectable links, Hyperlinked Titles 424, objects Related Similar 422 (more specifically, Related Game 422) and Related Any 423 are displayed. Object Related Similar 422, if selected, would initiate a search for similar items within the games category, Object Related Any 423, if selected, would initiate a search for similar media content across any media type. Suppose, for instance, that the user is considering the game of Risk. If the user were to select Related Similar 422 to find games similar to Risk, the present invention may return the game of chess, but it would not return information on a news broadcast covering Bobby Fisher. However, if the user had selected Related Any 423, which initiates a search for related items and relevant data, regardless of the media type or category; not only might the game of chess be returned but so might a news article about Bobby Fisher. The present invention may also return an Internet address relating to chess, such as www.chess.com. Referring again to FIG. 5, if a search was initiated by selecting either Related Similar 422 or Related Any 423, the present invention would add an updated page link such as Games Like 552 in Updated Page Index Area 550. Adding an updated page link such as Games Like 552, Action Movies 554 or Dramas 555 for each unique search allows users to back-track easily and quickly find desired media content.

Alternative guide area 430 provided in a preferred embodiment of the present invention can be used to display user-selectable objects EPG 431, DVD 432, Games 433, Web Search 434 or Music Guide 435 providing access to information selection mechanisms, including alternate media guides EPG 431 and Music Guide 435, and search engine selection mechanisms DVD 432, Games 433 and Web Search 434. These objects are provided in anticipation of the event that a user may not want to use Default Category Guide page links 451 provided by the present invention. For instance, user selectable object EPG 431 may access an EPG provided by a local cable company, and user selectable object Web Search 434 may access a web browser or possibly an Internet search engine such as Yahoo. Alternatively, utilizing a user selectable object, such as EPG 431, could cause information from an alternate guide, such as an EPG, to be displayed in Search Results Area 420 in a manner consistent with the display of results from searches initiated utilizing Updated Page Index Area 550.

Providing default category page links 451, and user selectable objects Related Similar 422 and Related Any 423, allows basic users, or users unfamiliar with advanced search techniques, to easily find content across many kinds of media. Access to alternate guides EPG 431 and Music Guide 435, search engine selection mechanisms DVD 432 and Games 433, and Web Search 434 allow advanced users, or those more comfortable searching detailed specific guides, to search in a manner that they prefer.

The final display item is Display Options Button 470, which allows users to control the amount of detail included in the displayed information throughout the various display areas. In a preferred embodiment of the present invention, Display Options Button 470 is designed to toggle the level of displayed information between a detailed level of information about programs identified during a search, and a cursory level of information, such as a program's title.

Each of the display areas discussed has some initial, or default, state to use when system 100, implementing the present invention, is initially powered on or when a new user session is started. The initial state can be dictated by a user's formal input, as described earlier. However, a preferred embodiment of the present invention provides for the initial state of tuned media display area 410, Page Index Display Area 450, and Search Results Area 420 to include items of probable user interest identified from user preferences and habits.

A preferred embodiment of the present invention will display, in tuned media display area 410, whatever is being currently viewed when the user interface is invoked. In one embodiment of the present invention, when system 100 of the present invention is initially started, it will display whatever channel was being viewed at the end of the last session, whether the channel was an Internet browser, a game, or a television show. In one embodiment of the present invention, the channel displayed may be whatever channel the system is normally tuned to at that time of day, based upon some pattern found by examining user preferences and habits.

As illustrated in FIG. 4, the search results area could, in a preferred embodiment of the present invention, initially display the contents of the page linked to default category page link Games 452 if an analysis of user preferences and habits indicates that this particular user normally plays chess at 5:00 p.m. If there were no clear usage pattern, or if directed by the user, the system could display information included in the page linked to default category page link TV 451.

In a preferred method of the present invention, page index area 450 would initially contain default category page links 451 defined by the user. However, if a clear pattern of, for example, using an Internet browser to search for news articles were indicated by an analysis of user preferences and habits, a link to default category page links 451 containing the users favorite news locations could be displayed.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 115 of one or more computer or information handling systems configured generally as described in FIGS. 1–6. Until required by the computer system, the set of instructions may be stored in another computer readable memory (i.e., in a hard disk drive, a removable memory such as an optical disk for eventual use in a CD-ROM drive, or a floppy disk for eventual use in a floppy disk drive). Further, the set of instructions can be stored in the memory of another computer or encoded or embodied in a signal, such as an analog or digital signal, embodied in a propagation medium and transmitted over the propagation medium by a user. The propagation medium may include a local area network or a wide area network, such as the Internet, or other propagation medium. One skilled in the art would appreciate that the physical storage or encoding of the sets of instructions physically changes the medium upon which it is stored or encoded electrically, magnetically, or chemically so that the medium carries computer readable instructions and other information. The invention is limited only by the following claims and their equivalents.

What is claimed is:

1. A method for searching, accessing and displaying data from various content sources through a single user interface comprising the following steps:

providing a first user selectable object via said single user interface;

providing a second user selectable object via said single user interface;

said first user selectable object being a link to a first content source, wherein said first content source is a data source of probable user interest based upon user preferences and habits;

said second user selectable object being a link to a second content source, wherein said second content source differs from said first content source;

receiving a user generated search query;

searching through data available from said first content source and from said second content source for data related to said user generated search query;

displaying results of data found from at least one of said first content source or said second content source determined to be related to said user generated search query, storing said found data related to said user generated search query in an updated page link;

enabling subsequent retrieval of said stored found data via said updated page link without requiring a corresponding subsequent search; providing a page index comprising said updated page link; and providing a user with a first selectable link for accessing a first relevant data from said found data.

2. The method of claim 1, wherein said first content source is an electronic program guide.

3. The method of claim 1, wherein said second content source is the Internet.

4. The method of claim 1, further comprising the steps of:

displaying a third selectable object associated with said first relevant data; and enabling said third selectable object to initiate a search for data related to said first relevant data from a third content source.

5. The method of claim 1, further comprising the step of providing a display options object for controlling a level of detail presented.

6. The method of claim 1, further comprising the step of displaying tuned media content concurrently with a display of said first and second user selectable objects.

7. The method of claim 1, wherein said user preferences and habits are based upon a usage pattern associated with a time of day.

8. A system for searching, accessing and displaying data from various content sources through a single user interface comprising:

at least one processor;

memory operably associated with said processor; and a program of instructions configured to be executed by said processor and stored in said memory, said program of instructions including instructions configured to execute the following steps:

providing a first user selectable object via said single user interface;

providing a second user selectable object via said single user interface;

said first user selectable object being a link to a first content source, wherein said first content source is a data source of probable user interest based upon user preferences and habits;

said second user selectable object being a link to a second content source, wherein said second content source differs from said first content source;

receiving a user generated search query;

searching through data available from said first content source and from said second content source for data related to said user generated search query;

displaying results of data found from at least one of said first content source or said second content source determined to be related to said user generated search query, and providing a user with a first selectable link for accessing a first relevant data from said found data;

wherein said program of instructions is further configured to store said found data related to said user generated search query in an updated page link, to enable subsequent retrieval of said stored found data via said updated page link without requiring a corresponding subsequent search, and to provide a page index comprising said updated page link.

9. The system of claim 8, wherein said first content source is an electronic program guide.

10. The system of claim 8, wherein said second content source is the Internet.

11. The system of claim 8, wherein said program of instructions is further configured to display a third selectable object associated with said first relevant data, and enabling said third selectable object to initiate a search for data related to said first relevant data from a third content source.

12. The system of claim 8, wherein said program of instructions is further configured to provide a display options object for controlling a level of detail presented.

13. The system of claim 8, wherein said program of instructions is further configured to display tuned media content concurrently with a display of said first and second user selectable objects.

14. The system of claim 8, wherein said user preferences and habits are based upon a usage pattern associated with a time of day.

15. A computer readable medium tangibly embodying a program of instructions implementing a method for searching, accessing and displaying data from various content sources through a single user interface comprising the following steps:

providing a first user selectable object via said single user interface;

providing a second user selectable object via said single user interface;

said first user selectable object being a link to a first content source, wherein said first content source is a data source of probable user interest based upon user preferences and habits;

said second user selectable object being a link to a second content source, wherein said second content source differs from said first content source;

receiving a user generated search query;

searching through data available from said first content source and from said second content source for data related to said user generated search query;

displaying results of data found from at least one of said first content source or said second content source determined to be related to said user generated search query;

storing said found data related to said user generated search query in an updated page link;

enabling subsequent retrieval of said stored found data via said updated page link without requiring a corresponding subsequent search; providing a page index comprising said updated page link; and providing a user with a first selectable link for accessing a first relevant data from said found data.

16. The computer readable medium of claim 15, wherein said first content source is an electronic program guide.

17. The computer readable medium of claim 15, wherein said second content source is the Internet.

18. The computer readable medium of claim 15, wherein said method further comprises the steps of:

displaying a third selectable object associated with said first relevant data; and enabling said third selectable object to initiate a search for data related to said first relevant data from a third content source.

19. The computer readable medium of claim 15, wherein said method further comprises the step of providing a display options object for controlling a level of detail presented.

20. The computer readable medium of claim 15, wherein said method further comprises the step of displaying tuned media content concurrently with a display of said first and second user selectable objects.

21. The computer readable medium of claim 15, wherein said user preferences and habits are based upon a usage pattern associated with a time of day.

* * * * *